United States Patent
Zimmerly

(10) Patent No.: US 6,382,239 B1
(45) Date of Patent: May 7, 2002

(54) LEAK-DETECTING DIVERTER VALVE

(75) Inventor: Robert D Zimmerly, Kenosha, WI (US)

(73) Assignee: Tri-Clover, Inc., Kenosha, WI (US)

( * ) Notice: Subject to any disclaimer, the term of this patent is extended or adjusted under 35 U.S.C. 154(b) by 0 days.

(21) Appl. No.: 09/207,637

(22) Filed: Dec. 9, 1998

(51) Int. Cl.$^7$ .............................................. F16K 11/048
(52) U.S. Cl. ...................... 137/312; 73/46; 137/614.13; 137/625.5
(58) Field of Search .................................. 137/240, 312, 137/614.17, 614.18, 614.19, 625.5, 625.48, 614.11, 614.13, 627.5; 73/40, 40.5 R, 49.1, 46

(56) References Cited

U.S. PATENT DOCUMENTS

| | | | | |
|---|---|---|---|---|
| 2,243,344 A | * | 5/1941 | Karst ........................... | 137/312 |
| 4,360,039 A | * | 11/1982 | Jeppsson ................ | 137/614.17 |
| 4,373,545 A | * | 2/1983 | Knappe ....................... | 137/312 |
| 4,617,955 A | * | 10/1986 | Melgaard .................... | 137/240 |
| 4,655,253 A | * | 4/1987 | Ourensma ................... | 137/312 |
| 5,152,320 A | | 10/1992 | Zimmerly .................... | 137/312 |

OTHER PUBLICATIONS

Tri–Clover Inc., 762 Reverse Acting Flo–Diversion Valve Product Data/Specifications, 1997.
Tri–Clover Inc., Tri–Clover® Flo–Diversion Valves, Jan. 1996.
Waukesha Cherry–Burrell, Non–Slamming HTST Divert Valve MOD W265FD & Aseptic MOD W285FD, 1997.

* cited by examiner

Primary Examiner—George L. Walton
(74) Attorney, Agent, or Firm—Ryan Kromholz & Manion SC

(57) ABSTRACT

A diverter valve for controlling a fluid flow without the sudden hammering pressure changes normally found in fluid control systems, and a method for assembling the valve. The valve includes a modular valve body with two substantially identical sections, each with a valve seat, oppositely arranged. The valve body also includes a T-shaped connecting section connected between the end openings of the two other sections. A valve stem shaft in the valve body has two valve plugs facing together, with the two valve seats between the valve plugs, so that each valve plug moves against the flow of the fluid to a closed position. A valve actuator shifts the valve stem shaft axially between first and second positions so that first one plug is closed, and then the other. The second valve plug is removably attached to the shaft by means of a hollow stem connected to the second valve plug preferably by means of threads. The hollow interior of this stem provides a channel for escape of any fluids leaking through the threaded connection so that such leakage can be detected.

6 Claims, 3 Drawing Sheets

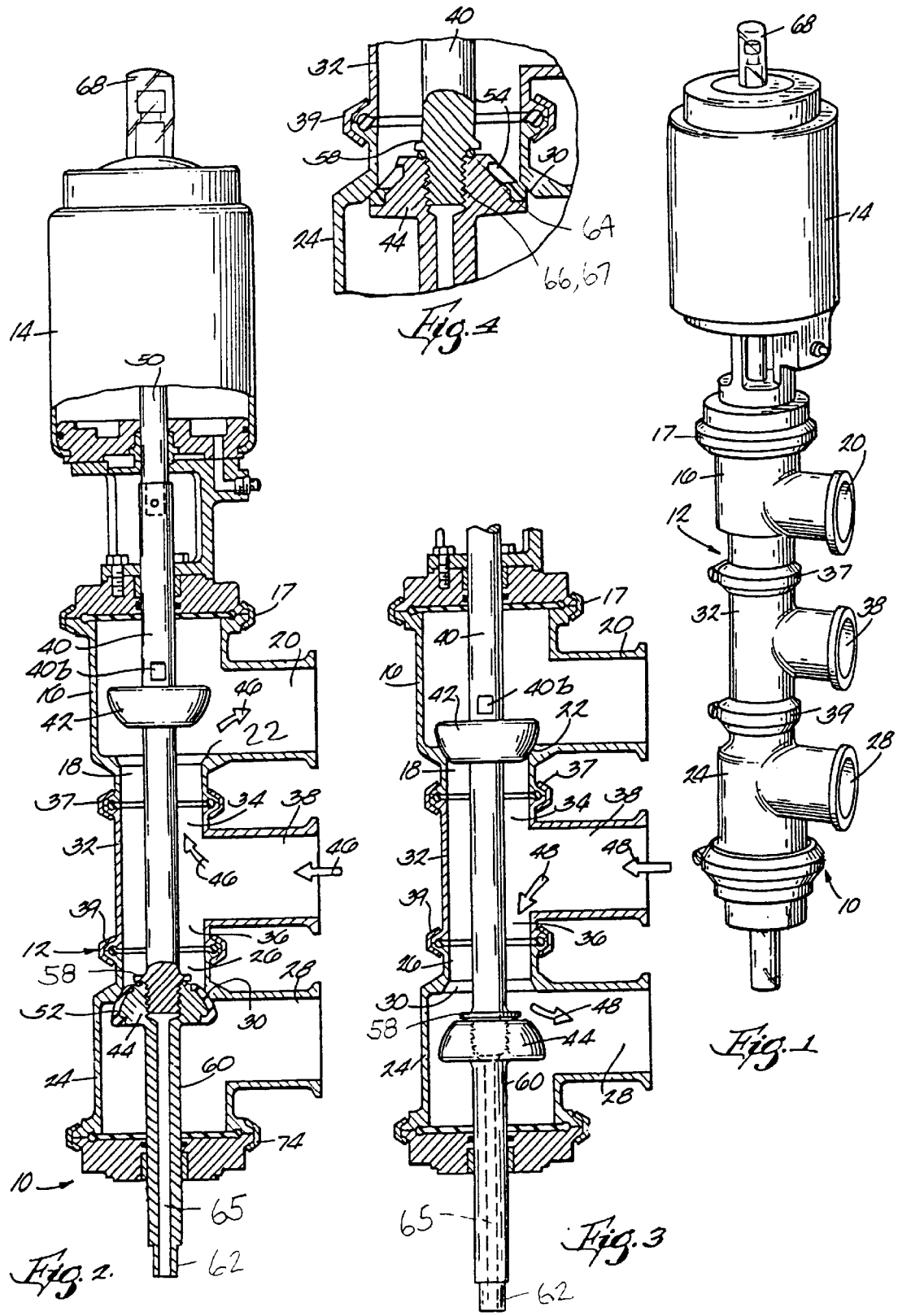

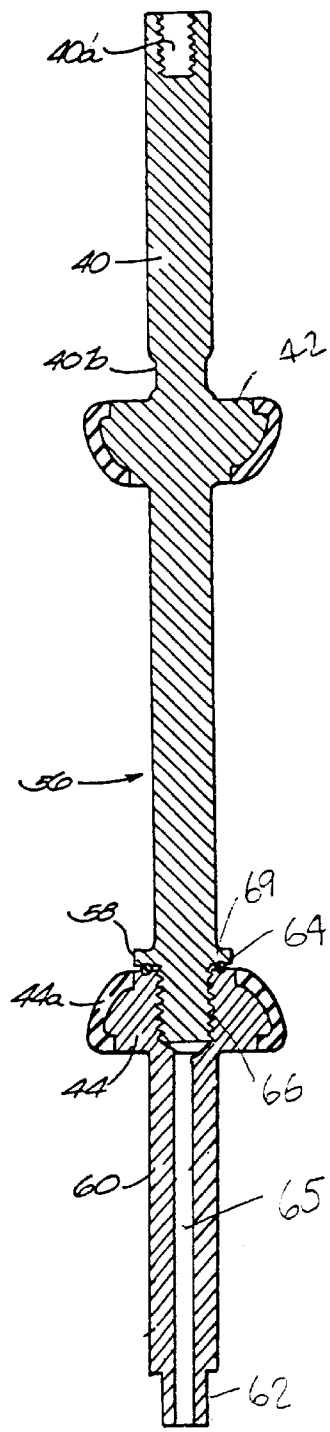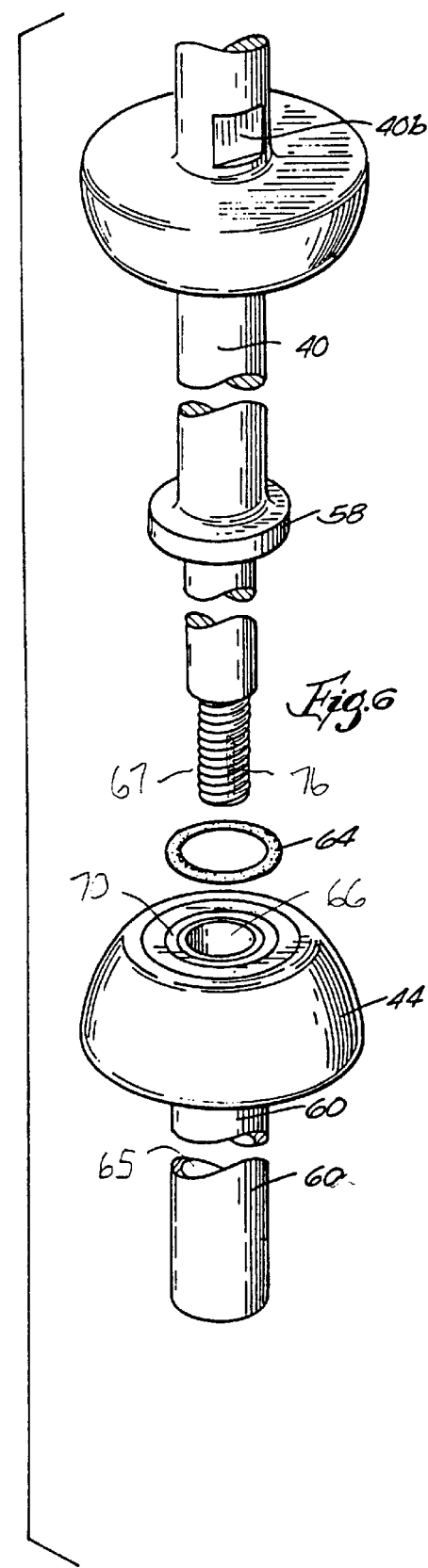

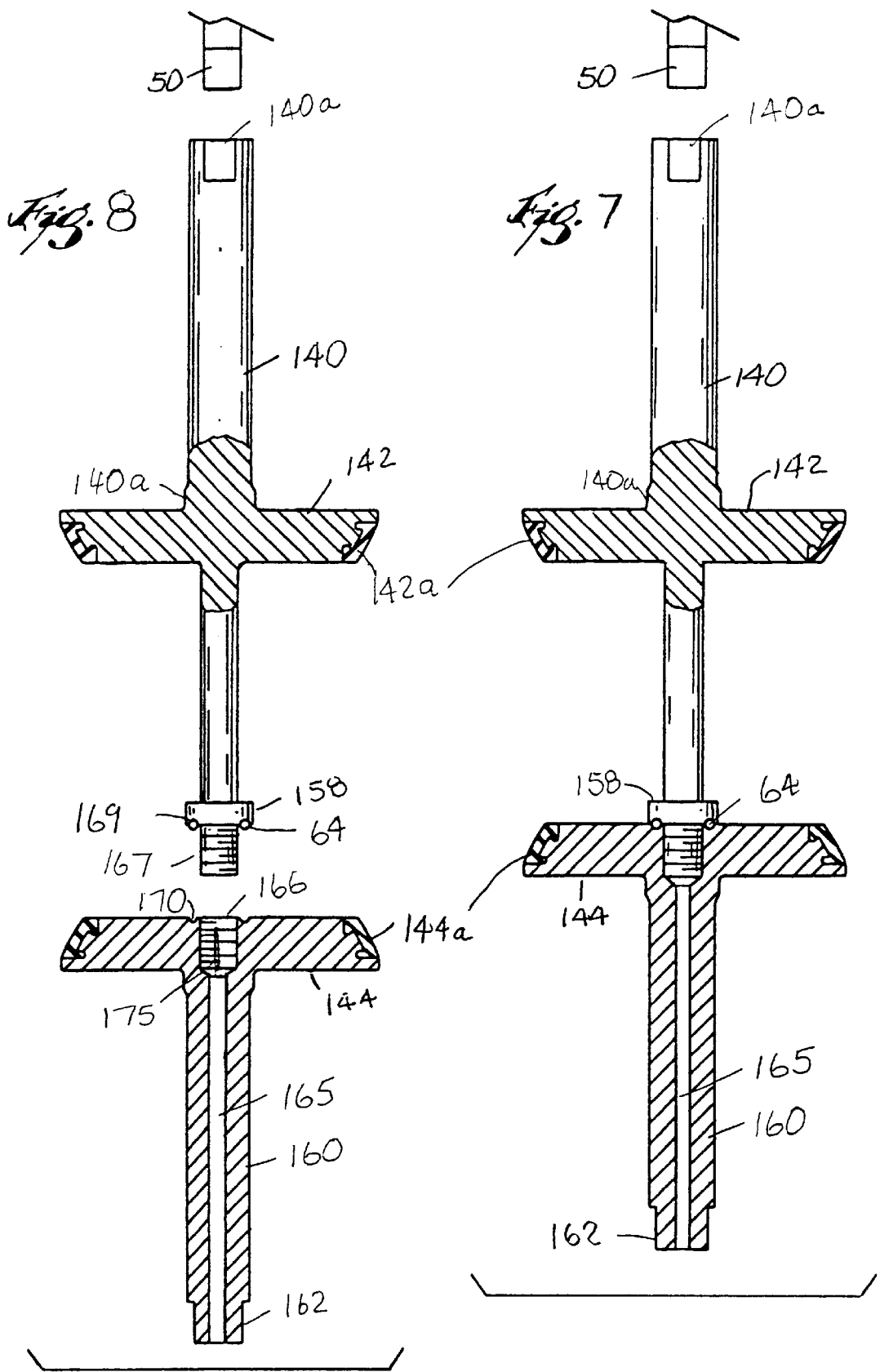

LEAK-DETECTING DIVERTER VALVE

BACKGROUND OF THE INVENTION

This invention relates to valve assemblies and valve stems, and in particular to valves the construction of which are optimized to reduce the sudden changes in pressure caused by routine mechanical opening and closing of the valves and which have a capability to allow detection of internal leakage therein.

In my U.S. Pat. No. 5,152,320, I disclosed diverter valves with pairs of shut-off valves arranged to both close in a direction opposite the fluid flow in order to prevent damage caused by "hammering."

SUMMARY OF THE INVENTION

This invention relates to alternative types of such diverter valves providing similar advantages with a simplified, economical construction. As in my above-noted patent, two valve plugs, actuated by a single actuator, each of which moves against the flow of the fluid to its closed position. The valve plugs are positioned on the valve stem shaft so that the valve seats are between the valve plugs. One of the valve plugs is removably attached to the shaft, such as by threaded fastening means, to allow for installation into and removal of the plugs from the valve body.

In a preferred embodiment the valve body comprises two substantially identical sections, an upper section and a lower section, each section having a side opening and an end opening, with a valve seat formed in the end opening. These two sections are oppositely arranged, with the end opening of each section facing the other section. The valve body also includes a T-shaped connecting section linked between the end openings of the two other sections. The connecting section has three openings, two of which are substantially co-linearly aligned and the third of which is non-aligned. The end opening of each of the first two sections is connected to one of the aligned openings of the T-shaped section.

Briefly, the invention relates to a valve stem assembly which includes a valve stem shaft connected a valve actuator having a pair of valve plugs removably attached to opposite ends of a shaft, the lowermost plug being supported on a hollow stem which forms an extension of the lower end of the shaft. The hollow stem permits any fluid leaking into a space between said shaft and the hollow stem to escape, thus providing externally visible evidence of any such leakage. Preferably the second valve plug body is attached to the shaft by threads, and an O-ring seal is provided between a shoulder on the shaft and the valve plug body.

Other objects and advantages of the invention will become apparent hereinafter.

DESCRIPTION OF THE DRAWING

FIG. 1 is an isometric view of a valve assembled according to a preferred embodiment of the invention.

FIG. 2 is a side elevational view of the valve shown in FIG. 1, shown partially cut away, with the valve stem in the position where the fluid is directed toward the upper outlet.

FIG. 3 is a fragmentary side elevational view of the valve shown in FIG. 1, shown partially cut away, with the valve stem in the position where the fluid is directed toward the lower outlet.

FIG. 4 is a fragmentary side elevational view of a portion of the valve shown in FIG. 1, with a different embodiment of valve stem gasket.

FIG. 5 is a cross-sectional view of a valve stem assembly constructed according to a preferred embodiment of the invention.

FIG. 6 is an exploded isometric view of the valve stem assembly shown in FIG. 5.

FIG. 7 is a cross-sectional view of a valve stem assembly constructed according to a modified embodiment of the invention.

FIG. 8 is an exploded view of the valve stem assembly shown in FIG. 7.

DETAILED DESCRIPTION OF THE INVENTION

Referring now to FIG. 1, there is shown a diverter valve 10 constructed according to a preferred embodiment of the invention. As shown, diverter valve 10 is constructed of a valve body assembly 12, with a valve actuator 14 connected to the top end of the valve body assembly.

Throughout this description and the appended claims there will be directional references, such as "upper", "lower", "top", "bottom", "left" and "right". These directional references refer only to the orientation of the structure shown in the drawing figures, and are for reference only. They are not intended to limit the claims.

As can be seen in FIGS. 1 and 2, the valve body assembly 12 is formed of several sections. An upper or first valve body 16 is attached to the valve actuator 14 by suitable removable means such as a clamp 17. First valve body 16 includes an inlet 18, generally in line with and facing away from the valve actuator 14, and an outlet 20 transverse to the inlet 18. First valve body 16 includes an upper or first valve seat 22 generally in proximity with its inlet 18.

The valve body assembly 12 also includes a lower or second valve body 24, which is substantially identical to first valve body 16, but oriented substantially oppositely. That is, second valve body 24 includes an inlet 26, generally in line with and facing the valve actuator 14, and an outlet 28 transversely oriented to the inlet 26. Second valve body 24 also includes a lower or second valve seat 30 generally in proximity with its inlet 26.

The valve body assembly 12 further includes a T-shaped connecting section or tee body 32, affixed between the inlet 18 of first valve body 16 and the inlet 26 of second valve body 24. Each of those two inlets 18, 26 is in fluid communication with a respective outlet 34 and 36 of tee body 32. And tee body 32 has its own inlet 38. In the embodiment shown in the drawing figures the two outlets 34, 36 are substantially co-linearly aligned, and the inlet 38 of which is transverse, or, not aligned with the outlets. Tee body 32 is connected to first valve body 16 and second valve body 24 by suitable removable clamps 37 and 39 respectively.

The assembled valve body assembly 12 provides a straight path through the first valve body 16, the tee body 32 and the second valve body 24. The assembled valve body assembly 12 is inserted a valve stem shaft 40. In the illustrated embodiment, the valve stem shaft 40 includes or has affixed thereto an upper or first valve plug 42, which is configured to mate with first valve seat 22 of first valve body 16. The valve stem shaft 40 is inserted to the valve body assembly 12 from the top, until first valve plug 42 contacts, or almost contacts, first valve seat 22. Then a lower or second valve plug 44, configured to mate with second valve seat 30 of second valve body 24, is inserted into the valve body assembly 12 from the bottom, with valve plug 44 facing second valve seat 30. The second valve plug 44 is attached to the valve stem shaft 40 with spacing between the valve plugs 42, 44 being somewhat greater than the spacing between the valve seats 22, 30.

As can be seen from a comparison of FIGS. 2 and 3, valve stem shaft 40 is moved between an upper position, permitting the controlled fluid to flow out the first valve body outlet 20, as indicated by arrows 46 (FIG. 2), and a lower position, permitting the controlled fluid to flow out the second valve body outlet 28, as indicated by arrows 48 (FIG. 3). Movement of valve stem shaft 40 is effected by valve actuator rod 50, connected to the valve stem shaft.

As shown in FIG. 5, the attachment of valve stem shaft 40 to the actuator rod 50 may be in the form of a blind hole 40a in the end of the valve stem shaft, which is threaded to a matching end of the actuator rod 50. While FIGS. 2 and 3 show valve plugs 42 and 44 with rubber gaskets 52, FIG. 4 illustrates the use of harder gaskets 54 such as polytetraflouroethylene, shown in U.S. Pat. No. 4,531,532, may be used as well.

FIGS. 5–8 show an improved attachment of the second valve plug 44 to the valve stem shaft 40, to provide an assembled valve stem 56 which provides leak-detecting capabilities. FIGS. 7 and 8 illustrate a version of the invention suitable for controlling flow in larger diameter pipes than the embodiment of FIGS. 1–6. Flange or shoulder 58 or 158 is formed on the shaft at the position just above the location of valve plug 44 or 142. In these embodiments, the second valve plug 44 or 144 is integral with a stem hollow 60, which extends in a direction away from the valve seat face 44a or 144a of the plug intended to contact the valve seat. The end of plug 44 or 144 is threaded, respectively, onto the end of shaft 40 or 140 until it contacts the shoulder 58 or 158. An O-ring 64 is provided to establish a fluid-tight seal between the exterior of plug 44 or 144 and the channel 65 or 165 which extends the length of the stem 60 or 160. In the embodiments shown, the stem 60 (160) is provided with threads 66 (166) which mate with male threads 67 (167) on valve stem shaft 40 or 140. The threaded connection may be provided with one or more grooves 175 extending across at least the lower portion of the threads 166, 167 to permit fluid flow through the threaded area. Alternatively, a groove 76 can be provided in the male threads 67 as illustrated in FIG. 6. Flat surfaces 40b (140a) and 62 (162), respectively, may be provided on the valve stem shafts 40 (140) and 60 (160) to assist in tightening the stems in place. Circular groove 69 and 70 (169 & 170 in FIGS. 7–8) are provided to sealingly receive O-ring 64.

Since a prime application of the valve incorporating this valve stem 56 is for sanitary applications such as food processing, it is important, and governmentally mandated that there be provided a means for indication of any leakage into the connection between the stem segments. Since, as shown in FIGS. 1 and 2, this point is located deep within the valve body assembly 12, means of showing leakage are provided by channel 65 or 165. The end of stem 60 or 160 extends out through seals in the bottom of housing 12 to permit any leaked fluid to exit at that point and to thereby alert the operator of the existence of a leak.

Leakage of fluid between second valve plug 44 in FIG. 1 and shoulder 58, into the threaded area 66, 67 would raise the possibility of spoilage and bacterial growth. However, since the leaked fluid can escape down the interior 65 of stem 60 clear indication of the leakage is provided.

Referring back to FIGS. 1 and 2, it is known to provide a clear tubule 68 at the top of the actuator 14, so that a portion of the actuator rod 50 can protrude above the housing, providing an indication of the current position of the valve stem 40.

The valve assemblies have been shown in the drawings in a vertical orientation for convenience. However, in use, such installations require a horizontal orientation of the assembly. In such cases it is important that drainage aperture 65 or 165 be of a diameter equal to the tap drill diameter of 66 or 166. This facilitates proper drainage and leak detection out of the assembly.

While the apparatus hereinbefore described is effectively adapted to fulfill the aforesaid objects, it is to be understood that the invention is not intended to be limited to the specific preferred embodiment of reverse-acting diverter valve set forth above. Rather, it is to be taken as including all reasonable equivalents within the scope of the following claims.

I claim:

1. A leak detecting valve assembly for controlling a fluid flowing therethrough, comprising:

a valve stem shaft;

means at a first end of said shaft for attaching said shaft to a valve actuator; and, a first valve plug positioned on said shaft in spaced relation to both ends of said shaft, having a valve plug face facing away from said first end, for mating with a first valve seat; the improvement wherein a second valve plug facing toward said first end, affixed to a valve plug body and provided with an integral hollow stem, removably and sealingly attached in an upper portion of said valve plug body by a threaded connection to a second end of said shaft, said hollow stem being adjacent to and extending a predetermined distance from said threaded connection to a location exterior of said leak detecting valve and permitting any fluid leaking through said threaded connection into a space between said second end of said shaft and said hollow stem to escape therethrough, thus providing externally visible evidence of any such leakage; and, at least one opening formed in said hollow stem in proximity to said second end to permit any leaked fluid To escape to the exterior of said leak detecting valve assembly.

2. A valve stem assembly as recited in claim 1 further comprising a shoulder integral with said shaft and an O-ring seal between said shoulder and said valve plug body.

3. A valve stem assembly as recited in claim 2 wherein cooperating circular indentations are provided in the valve plug body and in said shoulder for receiving said O-ring.

4. A leak-detecting diverter valve for controlling fluid flow comprising:

a valve body assembly including at least one inlet port, at least two outlet ports, and a valve seat for each of two of said outlet ports, said valve seats having valve plug mating surfaces;

a valve stem shaft disposed within said valve body assembly;

a first valve plug on said valve stem shaft disposed within said valve body assembly and arranged to mate with one of said valve seats when said valve stem shaft is in a first position, and to move to that position against the flow of the fluid;

a second valve plug attached to said valve stem shaft and arranged to mate with the other of said valve seats when said valve stem shaft is in a second position, and to move to that position against the flow of the fluid; said second valve plug being affixed to a valve plug body and supported by a hollow stem, said valve plug body being threadably and sealingly attached to a second end of said shaft in an upper portion of said valve plug body, said hollow stem being adjacent to and extending a predetermined distance from said threaded connection to a location exterior of said leak detecting valve body assembly and permitting any fluid leaking through said threaded connection into a space between said second end of said shaft and said hollow stem to escape, thus providing externally visible evidence of any such leakage; and, at least one opening formed in said hollow stem in proximity to said second end to permit any leaked fluid to escape therethrough to the exterior of said valve body assembly, and, an actuator for shifting said valve stem shaft axially within said valve body assembly between said first and second positions.

5. A diverter valve as recited in claim 4 comprising a shoulder integral with said shaft and an O-ring seal between said shoulder and said valve plug body.

6. A valve stem assembly as recited in claim 5 wherein cooperating circular indentations are provided in the valve plug body and in said shoulder for receiving said O-ring.

\* \* \* \* \*